US011126446B2

(12) United States Patent
Yang et al.

(10) Patent No.: US 11,126,446 B2
(45) Date of Patent: Sep. 21, 2021

(54) CONTEXTUAL EXTENSIBLE SKILLS FRAMEWORK ACROSS SURFACES

(71) Applicant: Microsoft Technology Licensing, LLC, Redmond, WA (US)

(72) Inventors: Chenguang Yang, Seattle, WA (US); Victor Poznanski, Sammamish, WA (US); Mark James Encarnación, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/653,314

(22) Filed: Oct. 15, 2019

(65) Prior Publication Data
US 2021/0109769 A1    Apr. 15, 2021

(51) Int. Cl.
G06F 9/451       (2018.01)
G06F 40/169     (2020.01)
G06F 40/30       (2020.01)

(52) U.S. Cl.
CPC ............ *G06F 9/453* (2018.02); *G06F 40/169* (2020.01); *G06F 40/30* (2020.01)

(58) Field of Classification Search
CPC ......... G06F 9/453; G06F 40/30; G06F 40/169
USPC ....................................................... 715/202
See application file for complete search history.

(56) References Cited

U.S. PATENT DOCUMENTS

| 7,493,614 | B2 * | 2/2009 | Liu | ................... G06F 9/44526 717/175 |
|---|---|---|---|---|
| 8,515,979 | B2 | 8/2013 | Mehta, et al. | |
| 2002/0072914 | A1 * | 6/2002 | Alshawi | ................... G10L 15/26 704/270.1 |
| 2005/0229104 | A1 * | 10/2005 | Franco | ................ G06F 9/44526 715/743 |
| 2007/0008573 | A1 * | 1/2007 | Yamada | ............. H04N 1/00973 358/1.15 |
| 2010/0318985 | A1 * | 12/2010 | Moffatt | ..................... G06F 8/65 717/175 |

(Continued)

FOREIGN PATENT DOCUMENTS

| CA | 2976777 A1 | 8/2016 |
| WO | 2018067402 A1 | 4/2018 |
| WO | WO-2018067402 A1 * | 4/2018 ............. G10L 15/26 |

OTHER PUBLICATIONS

"International Search Report and Written Opinion Issued in PCT Application No. PCT/US20/052985", dated Jan. 12, 2021, 15 Pages.

*Primary Examiner* — Stephen S Hong
*Assistant Examiner* — Broderick C Anderson

(57) ABSTRACT

In non-limiting examples of the present disclosure, systems, methods and devices for exposing computing service skills are presented. A task intent associated with a natural language input may be identified. A plurality of add-in matching language models may be applied to the natural language input, wherein each add-in matching language model corresponds to a computing service skill. A score for each of the computing service skills may be generated. Each of the computing service skills may be ranked. A selectable option to execute an add-in associated with a top ranked computing service skill may be caused to be displayed. An indication that a selection of the option has been made may be received. The add-in associated with the top ranked computing service skill may be executed.

20 Claims, 12 Drawing Sheets

(56) References Cited

U.S. PATENT DOCUMENTS

| | | | |
|---|---|---|---|
| 2012/0016678 A1* | 1/2012 | Gruber | G06F 16/3329 |
| | | | 704/275 |
| 2013/0124189 A1* | 5/2013 | Baldwin | G10L 15/1815 |
| | | | 704/9 |
| 2014/0019116 A1* | 1/2014 | Lundberg | G06F 8/30 |
| | | | 704/8 |
| 2014/0173694 A1* | 6/2014 | Kranz | G06F 21/629 |
| | | | 726/4 |
| 2017/0329466 A1* | 11/2017 | Krenkler | G06F 40/30 |
| 2017/0358303 A1* | 12/2017 | Walker, II | G10L 13/02 |
| 2018/0332169 A1* | 11/2018 | Somech | G06F 3/048 |
| 2019/0286451 A1* | 9/2019 | Awadallah | G06F 8/30 |

* cited by examiner

CONTEXTUAL EXTENSIBLE SKILLS FRAMEWORK ACROSS SURFACES

BACKGROUND

As native applications and operating system shell features of computing devices have become increasingly sophisticated, so too have the non-native, remote, and/or third-party applications and services that users rely on. These applications and services are utilized to enhance users' efficiency in performing work and personal tasks. The non-native, remote, and/or third-party applications and services that users rely on to perform these tasks typically have at least one cloud-based component. In some examples, these applications and services may be cloud-based and primarily accessed via the web. In other examples, an application may be installed locally, but some or all the data that a user interacts with via the application may be stored remotely. Many of the non-native, remote, and/or third-party applications and services that users rely on have add-ins for integration with native applications and shell features. However, users typically need to know that an add-in exists to download and install it. Additionally, even if an add-in is already installed on a user's local device, it may be difficult for the user to determine whether the add-in would be helpful in performing a current task that the user is engaged in or the user may not know that the add-in is available.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for exposing and accessing computing service skills and add-ins associated with those skills. A natural language input from a client device (e.g., in an application, in a shell element, in a document) may be received by an intent service. In examples, the intent service may make a determination as to whether the natural language input includes an intent. In additional examples, the intent service may make a determination as to an intent type that is included in the natural language input. The intent service may make these determinations based on application of one or more natural language processing models to the natural language input. The intent service may further utilize one or more factors and/or contextual signals in determining an intent type associated with a natural language input.

The intent service may maintain a service manifest that includes an identity of each of a plurality of computing service skills related to remote services, and a language model for matching a task intent to each of those computing service skills. The language model for a computing service skill may be utilized to determine a relevance between a natural language input and a computer service skill. In some examples, the language model may be utilized to determine a relevance between a natural language input and a computing service skill, and a particular object related to that skill. In additional examples, a remote service and/or a data source associated with a remote service may be matched to a task intent included in a natural language input and/or one or more key values included in a natural language input to determine a relevance between the natural language input and a computing service skill. In some examples, a remote computing service may make a determination as to whether it can return results, by executing a matched computing service skill, that are relevant to a natural language input (or key values in a natural language input). One or more factors and/or contextual signals may be utilized in determining the relevance between a particular object of a remote service and a natural language input.

According to examples, each computing service skill and/or corresponding object may be scored based on its relevance to the natural language input, a task intent included in a natural language input, a key value included in a natural language input, and/or a remote computing service's determination as to whether it can return a relevant result by performing an associated computing service skill. Each computing service skill may then be ranked according to its score. A selectable element for performing one or more highest-ranked computing service skills may then be surfaced in a construct (e.g., application construct, shell construct, a document construct) where the natural language input is located. In examples where an add-in corresponding to a selected skill is not already installed on a client device where the natural language input is located, the client device may surface a suggestion to install the add-in, or automatically obtain that add-in from an add-in store and install it. In examples where the add-in corresponds to a web application, the add-in may be added to the user's instance of the web application in the cloud. The add-in may then be executed, and the corresponding computing service skill may be performed.

BRIEF DESCRIPTION OF THE DRAWINGS

Non-limiting and non-exhaustive examples are described with reference to the following figures.

DETAILED DESCRIPTION

Figure 1:
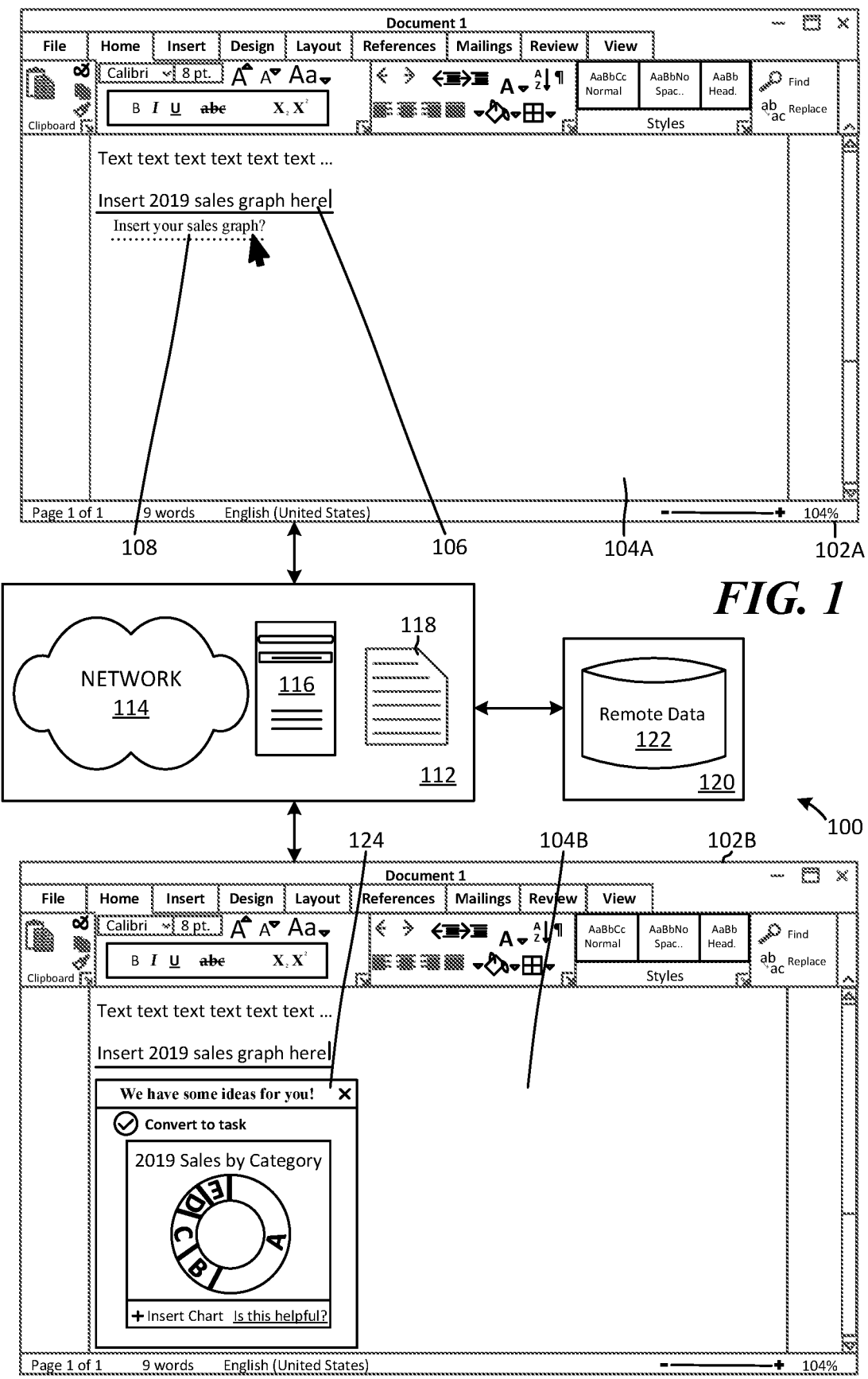
FIG. 1 is a schematic diagram illustrating an example distributed computing environment for identifying and executing a most relevant add-in based on a natural language input in a productivity application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for exposing and accessing computing service skills and add-ins associated with those computing service skills. As used herein a "computing service skill" or a "skill" may comprise one or more operations that are executed via an add-in or extension associated with a non-native, remote, and/or third-party application and service. "Computing service skill" or "skill" may additionally or alternatively comprise one or more operations that are executed via one or more connectors to obtain search results from a non-native, remote, and/or third-party application and service.

According to aspects described herein, a user of a computing device may provide a natural language input to a construct executed on the computing device. The construct may be an application executed on the computing device, a document executed/open on the computing device, a canvas executed/open on the computing device, or an operating system shell element of the computing device. Exemplary applications and/or document types where the natural language input may be received include productivity applications (e.g., word processing applications, presentation applications, spreadsheet applications, email applications, web browsing applications, direct messaging applications, calendar applications, task management applications, etc.). Exemplary shell constructs where the natural language input may be received include taskbar search elements, file browsing search elements, and/or folder browsing search elements, for example. The natural language input may comprise a piece of text (e.g., a single word or a phrase, a plurality of words or phrases, a complete document, a set of documents). In some examples, the natural language input may be a direct command to execute an operation and/or skill. In other examples, the natural language input may be an implicit command to execute an operation and/or skill.

The natural language input may be automatically sent to, and analyzed by, an intent service. The intent service may be executed all or in part in the cloud. The intent service may include one or more components, including for example, a natural language processing engine (including one or more language processing models and/or modules that include one or more language processing models), a tenant add-in rules engine, a skill scoring engine, and/or a skill ranking engine.

The intent service may further include one or more object ranking engines, the object ranking engines comprising one or more machine learning models that have been trained to classify objects based on relevance to a natural language input and/or contextual information related to the natural language input. The intent service may be executed on a client computing device, on one or more cloud-based computing devices, and/or partially on a client computing device and partially on one or more cloud-based computing devices.

In examples where a natural language input is received by an application, it may be received in the body of a document or other application element (e.g., a subject field of an email, a draft field of an instant messaging application, etc.). One or more natural language processing models that have been trained to identify whether there is a task intent associated with a natural language input may be applied to the received natural language input. In some examples, a natural language input must meet a threshold likelihood of including a task intent prior to the intent service performing additional processing on the natural language input. In some examples, if a natural language input is determined to include a task intent, a natural language processing model (the same or a different model as just discussed above) may identify a type of task intent associated with the natural language input (e.g., identify object, identify and insert object, perform action A, etc.). In some examples, a single task intent may be identified in a natural language input. In other examples, a plurality of task intents may be identified in a natural language input. According to additional examples, one or more key entities and/or key values may be extracted from a natural language input. The key entities and/or key values may be utilized to further define a requirement of the skill. For example, while the task intent type for the natural language input "insert a chart of 2010 sales data" may be "insert chart", key entities and/or key values of "2010" and "sales data" may be extracted such that the skill can return a relevant result via a skill corresponding to the task intent type. In some examples, the language model itself can perform this extraction and pass the key entities and/or key values to a remote service corresponding to the skill. In other examples, the remote service itself may perform this operation.

According to additional examples, one or more signals and/or factors may be utilized in determining what type of task intent is associated with a natural language input. The one or more signals and/or factors may include: contextual information from a computing device associated with a natural language input (e.g., a computing device located at home may have a higher correlation to personal tasks, a computing device located at work may have a higher correlation to work-type tasks), an application or document that includes the natural language input (e.g., information in an application or document where a natural language input is located may indicate a higher likelihood that a user is performing one task type over another, some tasks are more appropriate for one application than another application), a shell construct associated with a natural language input (e.g., a query input in a file browsing construct may have a higher correlation with locating and opening a separate document than locating an object and inserting it into a document), and/or a user profile associated with a natural language input (e.g., a user may have a history of performing tasks of various types, a user may have provided feedback to the intent service regarding previously-identified task intents).

The intent service may include a manifest comprising an identity of each of a plurality of computing service skills and a corresponding language model for each of those skills that can be applied to a natural language input to determine a relevance that the natural language input has to each skill. A language model for a computing service skill may be custom-made by a skill provider (e.g., the remote service provider of the skill, the third-party provider of the skill) or built utilizing a language model template provided by an entity that maintains the manifest (e.g., the skill provider may provide the entity that maintains the manifest with keywords and/or phrases that will trigger a skill). Each of the computing service skills may be associated with an add-in for executing the corresponding skill. In examples, the manifest may also comprise metadata describing each of the plurality of computing service skills, one or more surfaces that each of the computing service skills may be surfaced on, logic for coordinating data-fetching associated with computing service skills, and/or logic for coordinating triggering of each of the computing service skills.

Upon determining that there is a task intent associated with a natural language input, a plurality of language models from the manifest may be applied to the natural language input. In examples, a score related to a likelihood that each corresponding computing service skill is likely to be relevant to the task intent may be generated for each of the computing service skills based on the applied language models. In some examples, the score may be generated based only on a computing service skill's relevance to an identified task intent. In other examples, where the task intent type relates to identification of an object or objects, the score may be generated based on a computing service skill's relevance to an identified task intent, and a relevance of one or more objects associated with the computing service skill. For example, a skill for retrieving a specific user's contact card ("Jane Doe") for a business contact saved to an enterprise resource planning (ERP) service would have a higher relevance to the natural language input "add Jane Doe's contact card here" than the natural language input "add John Smith's contact card here". One or more factors and/or signals may be utilized in determining an object's relevance to a task intent and/or user. Exemplary factors and/or signals that may be utilized in determining an object's relevance include: an object's content (e.g., in a document object, in an audio object), an object's title, an identity of current user (e.g., the user's account identity and corresponding data), other users that are related to a current user, and/or objects that are related to a current user, for example. Thus, while for some users, the natural language input "add Jane Doe's contact card here" may trigger an ERP skill and corresponding ERP object, for other users, that same natural language input may trigger a different skill and/or object (e.g., an electronic address book lookup and contact).

Upon generating a score for each of the computing service skills based on application of the language models from the manifest, each of those skills (and in some instances the skills and corresponding objects) may be ranked. In examples, a selectable option may be provided for executing an add-in associated with a highest-ranked skill. In some examples, if the add-in is not already installed on the client device where the natural language input was initially received, the add-in may be automatically obtained from an add-in store and installed by the client device. The computing service skill corresponding to that add-in may then be automatically performed via execution of the add-in. In examples where the add-in is already installed on the client device where the natural language input was initially received, the computing service skill corresponding to that add-in may be automatically performed via execution of the add-in. In examples where the computing service skill comprises one or more operations that are executed via one or more connectors to obtain search results from a non-native, remote, and/or third-party application and service, the search may be automatically performed, and one or more relevant results retrieved. In examples where a natural language input is determined to include more than one task intent, a plurality of highest-ranked skills may be surfaced and/or executed.

The systems, methods, and devices described herein provide technical advantages for identifying and executing add-ins and their corresponding computing service skills. Processing costs (i.e., CPU cycles) associated with performing manual searches of add-in stores to identify add-ins that are relevant to users' electronic tasks are significantly reduced by the mechanisms described herein via automatic identification of task intents in natural language inputs and subsequent identification of relevant add-ins, computing service skills, and/or objects related to those computing service skills. The mechanisms described herein also provide an enhanced user experience in that users do not have to interrupt their workflow to identify add-ins and corresponding computing service skills to complete tasks they are working on. Rather, the mechanisms described herein provide for the surfacing of useful operations and related content within a user's typical workflow. Add-in service providers may also automatically drive user engagement to their services simply by exposing their skills and related content to users and client devices via a central manifest registration process.

FIG. 1 is a schematic diagram illustrating an example distributed computing environment 100 for identifying and executing a most relevant add-in based on a natural language input in a productivity application. Computing environment 100 includes word processing user interface 102A, network and processing sub-environment 112, remote service data store 122, and word processing user interface 102B. Any and all of the computing devices described herein may communicate with one another via a network such as network 114 in network and processing sub-environment 112.

Word processing user interface 102A and 102B are the same user interface, illustrated at different times, and they are displayed by a computing device (not shown). Word processing user interface 102A includes document 104A, which further includes text, and specifically, the natural language input 106, which states: "Insert 2019 sales graph here". In some examples, data from the word processing application that is displaying word processing user interface 102A may be sent to an intent service executed by one or more computing devices (e.g., server computing device 116) in network and processing sub-environment 112. The data from the word processing application may be sent at periodic intervals (e.g., every X milliseconds, every Y seconds, etc.), each time a modification has been made to a document (e.g., new text is added, existing text is deleted, a save command is received, etc.), and/or periodically and each time a modification has been made to a document.

The intent service executed in network and processing sub-environment 112 may include one or more processing engines. For example, the intent service may include a natural language processing engine, an add-in rules engine, a computing service skill scoring engine, and/or a computing service skill ranking engine. The intent service may also include computing service skill manifest 118.

Remote service data store 120 is illustrative of data that is associated with a plurality of applications and/or services available from a plurality of entities. For example, a user account (or a related account) associated with the computing device that the word processing application is executed on may also be associated with one or more applications and or services that are not native to, that are not executed locally on, and/or for which content generated by those applications and/or services is not entirely stored on the computing device that the word processing application is executed on. The user account (or the related account) may be utilized to access those applications and/or services from the computing device that the word processing application is executed on. Thus, remote service data store 122 represents data and/or processing operations associated with those applications and/or services. In non-limiting examples, remote service data store 122 may include application and/or service data associated with: customer relationship management applications and/or services, enterprise resource planning applications and/or services, cloud storage applications and/or services, image curation applications and/or services; cloud-based productivity applications and/or services; independent contractor (or "gig worker") applications and/or services; and/or IoT ("internet of things") applications and/or services, among others.

Manifest 118 provides a mechanism for the applications and/or services associated with remote service data store 122 to efficiently expose their application add-ins and associated computing service skills for utilization by applications (e.g., word processing applications, presentation applications, spreadsheet applications, task completion applications, calendar applications, image editing applications, web browser applications, etc.) and shell constructs (e.g., operating system search elements, folder browsing elements, etc.) of computing devices. For each of the entities represented by remote service data store 122, manifest 118 may include: an add-in matching language model for each add-in and/or computing service skill associated with those entities, metadata describing each of the add-ins and/or computing service skills associated with those entities, one or more surfaces that each of the add-ins and/or computing service skills associated with those entities may be surfaced on, a description of how each of the add-ins and/or computing service skills associated with those entities may be rendered, logic for coordinating data-fetching associated with each of those add-ins and/or computing service skills, and/or logic for coordinating the triggering of each of the add-ins and/or computing service skills.

Thus, in some examples, each entity associated with remote service data store 122 may provide an identity of an add-in and/or computing service skill that it will make available, a description of what that add-in and/or computing service skill does, and a language model for matching a natural language input (e.g., natural language input 106) to the add-in and/or computing service skill. In some examples, the language model may be a simple model such as a keyword and/or phrase matching model. In examples, a match score, or confidence score, may be calculated for each computing service skill based on a corresponding language model. In other examples, the language model may be a more sophisticated model (e.g., a semantic parsing model, a topic detection model, a hidden Markov model, a maximum entropy Markov model, a conditional random field model, a support vector machine model, a decision tree model, a deep neural network model, a general sequence-to-sequence model, a conditional probability recurrent neural network model, a transformer network model, a generative model, a recurrent neural network for feature extractors model, a long short-term memory model, a GRU model, a deep neural network model for word-by-word classification, a latent variable graphical model, etc.). In examples, the description of the add-in and/or computing service skill may comprise a classification of operations performed by the add-in and/or computing service skill. Thus, the language model for an add-in and/or computing service skill may identify and/or calculate a correlation (e.g., a match score or confidence score) between a natural language input and the description/classification of the add-in and/or computing service skill. In additional examples, one or more natural language processing models may be applied to a natural language input (e.g., natural language input 106), which are applied to identify one or more task intent types associated with the natural language input. The one or more task intent types that are identified may then be matched to one or more add-in and/or computing service skill descriptions based on application of a corresponding language models in manifest 118.

In the current example, one or more natural language processing models are applied to natural language input 106. A task intent type may be identified for natural language input 106 (e.g., insert object, insert graph, insert sales graph, verify assertion, etc.). A language model for each of a plurality of add-ins and/or computing service skills may be applied to the natural language input and/or the identified task intent, and a corresponding score for each of those add-ins and/or computing service skills may be generated. Thus, in this example, based on natural language input 106, scores may have been generated for a plurality of add-ins and/or computing service skills. For example, a score for an image selection computing service skill for an image curation application may have been generated based on a language model specific to that skill (e.g., a medium score based on its correlation to the task intent type of natural language input 106), a score for inserting a sales contact from a CRM service may have been generated based on a language model specific to that skill (e.g., a low score based on its correlation to the task intent type of natural language input 106), and a score for inserting a 2019 sales graph from an ERP service may have been generated based on a language model specific to that skill (e.g., a high score based on its correlation to the task intent type of natural language input 106), among others.

According to examples, each of the scores may be generated based on a plurality of factors. For example, a task type factor might be matched against the natural language input (e.g., insert object, insert graph, etc.), and a specific piece of data from a data store may also be included as a factor. That is, for a single skill and/or add-in, multiple scores may be generated for individual objects/services associated with those skills and/or add-ins. Thus, for the ERP service, there may be a plurality of sales graphs (e.g., a 2017 sales graph, a 2018 sales graph, a 2019 sales graph), and a separate score may be calculated for each of those graphs.

In some examples, each of the add-ins, computing service skills, and/or objects associated with those add-ins and/or computing service skills may be ranked according to their scores, and a selectable option to execute a top ranked add-in and/or computing service skill may be caused to be displayed in association with natural language input 106. Thus, in this example, the intent service has identified that the score for a computing service skill/application add-in for inserting a 2019 sales graph from an ERP service is the highest-ranked skill in relation to natural language input 106. As such, the intent service causes selectable option 108, which states: "Insert your sales graph?" to be displayed in association with natural language input 106. A user has selected that selectable option, which causes the corresponding computing service skill and/or application add-in to be executed. Thus, in this example, when selectable option 108 is selected, an add-in for obtaining a graph object from an ERP service associated with the user account for the user accessing the word processing application may be executed, the 2019 sales graph may be obtained, and corresponding graph 124 may be inserted as illustrated on word processing document 104B. An insert object or insert graph task may also be added and/or checked off of a task completion application associated with the user account.

Figure 2:
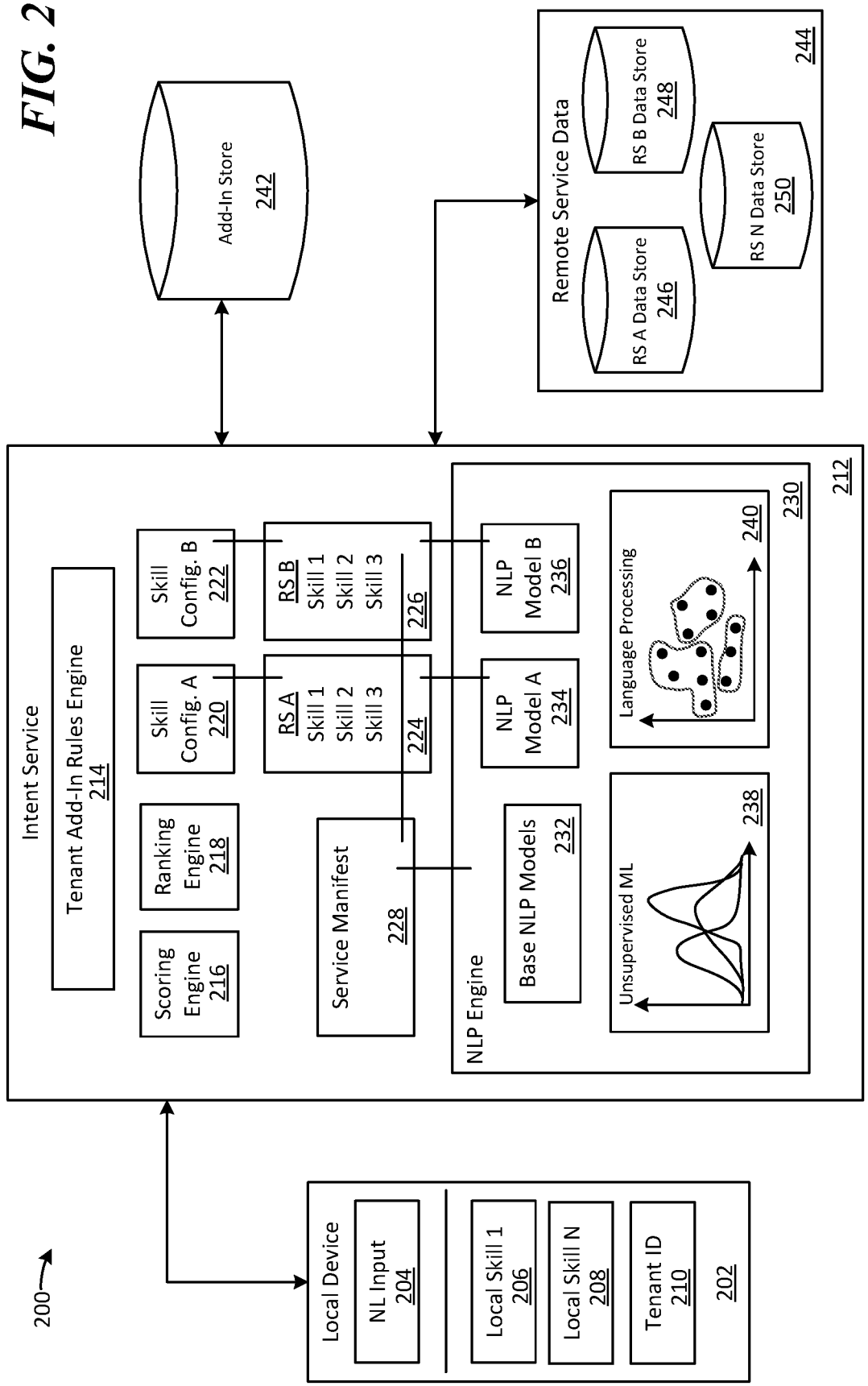
FIG. 2 is a schematic diagram illustrating a distributed computing environment for identifying and executing relevant add-ins utilizing an intent service and its associated engines.

FIG. 2 is a schematic diagram illustrating a distributed computing environment 200 for identifying and executing relevant add-ins utilizing an intent service and its associated engines. Distributed computing environment 200 includes intent service 212, local device sub-environment 202, add-in store 242, and remote service data sub-environment 244.

Local device sub-environment 202 illustrates a local computing device that may execute a highest-ranked add-in and/or computing service skill. Natural language input 204 may be received by an application (e.g., a word processing application, a presentation application, etc.) or shell construct (e.g., a search element in a toolbar, a search element in a file browsing component) of the local device. The local device has a plurality of add-ins, corresponding to a plurality of computing service skills, that have already been installed on it. That is, the local device has installed add-ins for executing local skill 1 206 and local skill N 208. The local device is also associated with tenant ID 210. Tenant ID 210 may be utilized by an administrator associated with the local device to provide access to and/or restrict access to applications and services, including application add-ins. For example, an administrator may provide a list of applications, services and/or add-ins that the local device may be granted with access to, and/or a list of applications, services and/or add-ins that the local device may not be granted with access to.

Natural language input 204 and tenant ID 210 may be automatically provided to intent service 212. Intent service 212 may identify one or more applications, services and/or add-ins that a user account associated with the local device has a registered account for. Tenant add-in rules engine 214 may then identify, utilizing tenant ID 210, which of those applications, services and/or add-ins are approved for use by the local device. In this example, tenant add-in rules engine identifies that the user account associated with the local device has an associated account for, and that the local device is approved to access, remote service A 224 and remote service B 226. Each of remote service A 224 and remote service B 226 include three computing service skills. The identity of each of those skills may be stored in service manifest 228. In some examples, service manifest 228 may also include language processing models (e.g., natural language processing model A 234, natural language processing model B 236) for each of those skills and skill configuration information (e.g., skill configuration A 220, skill configuration B 222) for each of those skills. The skill configuration information may include a description of how a user interface and/or user experience for a skill will be rendered, what the properties of a skill are, what language model for a skill is, and/or a location of objects associated with a skill.

In this example, the language processing models for the computing service skills are included in natural language processing engine 230. Natural language processing engine 230 includes base natural language processing models 232, natural language processing model A 234, natural language processing model B 236, unsupervised machine learning model 238, and clustering language processing model 240. Unsupervised machine learning model 238 and clustering language processing model 240 are illustrative of the various types of language processing models that may be applied to a natural language input to match it to a skill and/or add-in according to the mechanisms described herein. Natural language processing model A 234 may be applied to a natural language input to match that input to one or more skills provided by remote service A 224. Similarly, natural language processing model B 236 may be applied to a natural language input to match that input to one or more skills provided by remote service B 226. One or more natural language processing models included in illustrative natural language processing models 232 may be applied to a natural language input to identify whether the natural language input has a task intent associated with it and/or to identify one or more specific task intents (task intent types) associated with the natural language input.

In some examples, a first threshold must be met for a natural language input based on one or more models in base natural language processing models 232 before one or more add-in/skill models (e.g., NLP model A 234, NLP model B 236) are applied to the natural language input. For example, a determination may have to be made that there is an 80%, 90%, or 95% likelihood based on application of a base natural language processing model that natural language input 204 includes a task intent before applying one or more add-in/skill models to natural language input 204. In some examples, the base natural language processing models may be relatively low cost from a processing standpoint and act as a filter such that higher cost add-in/skill models need not be applied to natural language inputs that do not reach the threshold.

Add-ins for the computing service skills included in remote service A 224 and remote service B 226 may be accessible from add-in store 242. That is, the local device may download add-ins for those respective skills and services from add-in store 242.

Remote service data sub-environment 244 includes data for a plurality of applications and/or services that are associated with a user account that is being accessed/utilized by the local device. For example, remote service A data store 246 may correspond to the same service as remote service 224. Remote service A data store 246 may include documents, objects, files, etc. that the user account has accessed, generated, and/or stored in association with that service. Similarly, remote service B data store 248 may correspond to the same service as remote service 226. Remote service B data store 248 may include documents, objects, files, etc. that the user account has accessed, generated, and/or stored in association with that service. Remote service data sub-environment 244 may include stores for one or more additional services, as illustrated by remote service N data store 250.

According to examples, for a given natural language input, scoring engine 216 generates a score for each computing service skill that local device 202 has access to. In some examples, scoring engine 216 may generate a score based on matching an identified task intent and/or task intent type for a natural language input to the skill itself and/or an object (e.g., a file, an image, a graph, etc.) that the skill will be utilized to retrieve. Thus, for a single skill and a single natural language input, a plurality of scores may be generated (e.g., a first score for a first object that will be retrieved from a remote service store via execution of the skill, a second score for a second object that will be retrieved from the remote service store via execution of the skill, etc.). That is, the scoring engine, applying a corresponding language processing model for a given skill, may determine how closely a task intent of a natural language input matches the skill itself (e.g., obtain object, insert object, perform operation, etc.) and/or how closely the task intent and/or context of the natural language input matches an object associated with the skill (e.g., obtain object A, insert object B, perform operation C, etc.).

Scoring engine 216 may utilize one or more additional factors and/or signals in generating a score for a given computing service skill and/or object. For example, the scoring engine may generate a score for an object and/or a computing service skill based on contextual information from a computing device associated with a natural language input (e.g., a computing device located at home may have a higher correlation to home-based IoT services, a computing device located at work may have a higher correlation to work-type applications, services, and computing service skills), an application or document associated with a natural language input (e.g., the intent service may identify that a document that includes the natural language input is a work-type document and therefore the document may have a higher correlation to work-type applications, services and computing service skills), a shell construct associated with a natural language input (e.g., a query input in a file browsing construct may have a higher correlation with a cloud-based storage service than a video editing service), and/or a user profile associated with a natural language input (e.g., a user feedback loop may be utilized for identifying relevant content and/or computing service skills based on user preferences and/or past feedback). In examples where more than one factor and/or signal is utilized to generate a score for a computing service skill and/or object, scoring engine 216 may utilize a weighted format in calculating the final score (e.g., some signals or factors may be weighted higher or lower than others). In some examples, there may be a scoring layer associated with scoring engine 216. In other examples, there may be a plurality of scoring layers associated with scoring engine 216.

Once the computing service skills have been scored, ranking engine 218 ranks those skills according to their corresponding scores. One or more highest-ranked skills may then be caused to be surfaced on local device 202 for selection by a user. In some examples, there may be a single ranking layer associated with ranking engine 218. In other examples, there may be a plurality of ranking layers associated with ranking engine 218.

If an add-in associated with the skill is already installed on local device 202, the add-in and/or skill may simply be executed upon selection of the add-in and/or skill. If the add-in associated with the skill is not already installed on local device 202, the add-in may be automatically downloaded from add-in store 242 and installed on local device 202 where it may be executed. In other examples, a recommendation for downloading the add-in may be surfaced on local device 202. In examples where the add-in corresponds to a web application (e.g., the natural language input is in an application that is being accessed online via a browser), the add-in may be added to the user's instance of the web application in the cloud (or a recommendation for adding the add-in to the user's instance of the web application the cloud may be surfaced).

Figure 3:
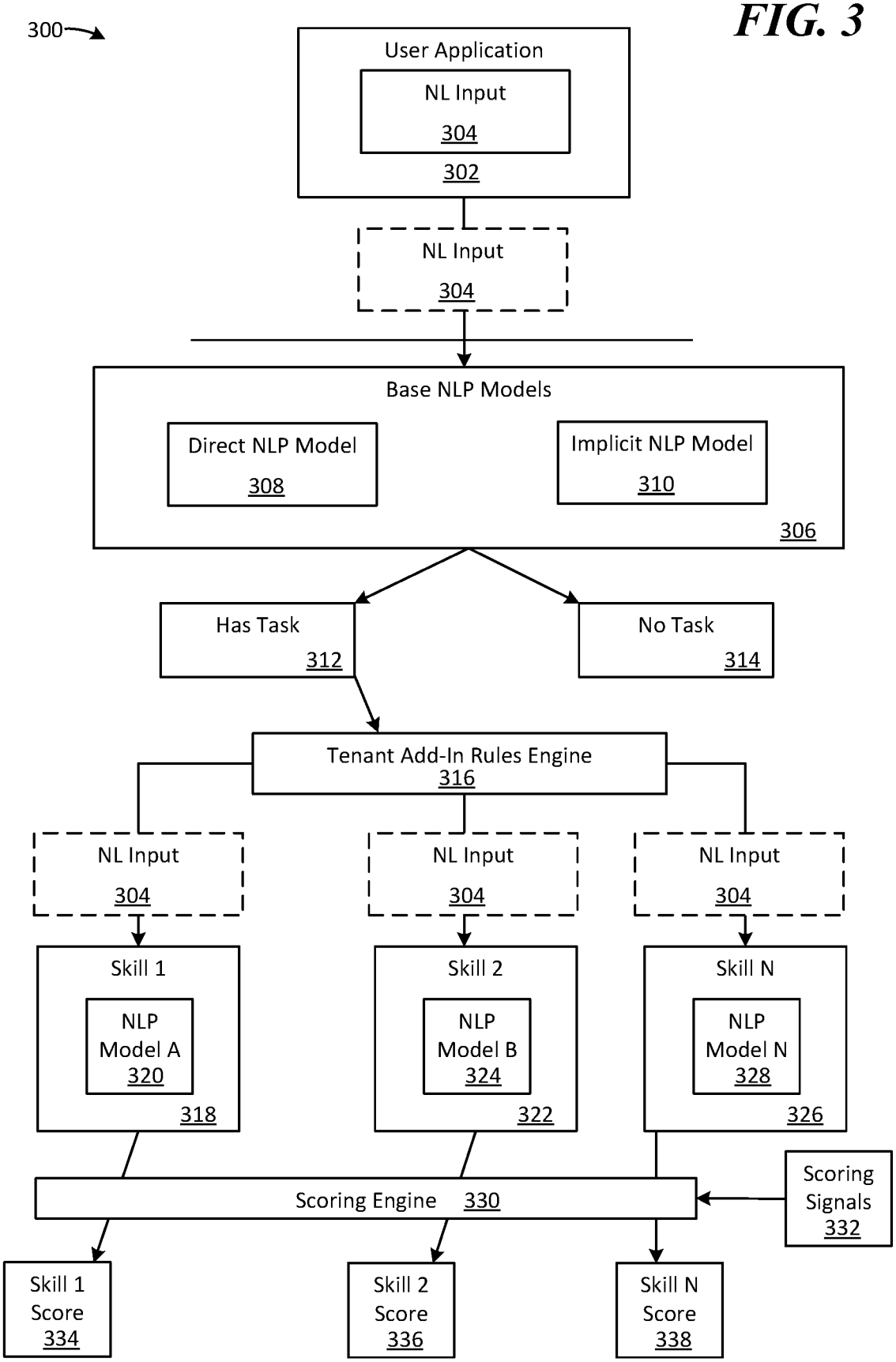
FIG. 3 is a block diagram illustrating a computing environment and process flow for scoring add-ins for computing service skills related to a natural language input.

FIG. 3 is a block diagram illustrating a computing environment and process flow 300 for scoring add-ins for computing service skills related to a natural language input.

Computing environment and process flow 300 includes user application 302, which includes natural language input 304. An application is one example of a computing construct where a natural language input may be received and scored utilizing the mechanisms described herein. A natural language input may also be received by a shell construct of a computing device and scored utilizing the mechanisms described herein. User application may be a productivity application (e.g., a word processing application, a presentation application, a spreadsheet application, a task application, etc.).

Natural language input 304 is received by an intent service associated with a user account used to access the computing device executing user application 302. The intent service may apply one or more natural language processing models to natural language input 304 to determine whether there is a task intent associated with natural language input 304. In this example, this first level of processing is illustrated in base natural language processing models element 306, which includes direct NLP model 308 and implicit NLP model 310. In some examples, the intent service may also identify a task intent type associated with natural language input 304. Direct NLP model 308 may be trained to identify task intents associated with direct task commands (e.g., "insert object A", "perform operation B"). Alternatively, implicit NLP model 310 may be trained to identify implicit commands (e.g., "you can find the spec here" may be an implicit command to retrieve and insert a specific object or add a link to a specific object). A score may be generated for a natural language input by one or both models. The score may correspond to a likelihood that the natural language input includes a task intent. If a threshold score is reached, the input may be moved along for further processing, as illustrated by has task element 312. If the threshold score is not reached, no further processing may be performed on the input, as illustrated by no task element 314.

If a determination is made that there is a task intent associated with natural language input 304, a determination may be made by tenant add-in rules engine 316 as to which computing service skills the user account associated with the computing device executing user application 302 has access to. Tenant add-in rules engine 316 may be applied in enterprise scenarios and/or educational scenarios, for example. In other examples, there may not be an add-in rules engine, as there may be no restrictions to the computing service skills that are available to a computing device and/or user account associated with a computing device.

Upon determining which computing service skills the user account associated with the computing device has access to, a language processing model associated with each of those skills may be applied to natural language input 304. This is illustrated by NLP model A 320 in skill element 1 318, NLP model B 324 in skill element 2 322, and NLP model N 328 in skill element N 326. In some examples, the language models applied to natural language input 304 may be custom models provided for a skills manifest by the computing service skill providers (i.e., the application and service providers associated with the skills). In other examples, the manifest owner may provide a template that the computing service skill providers may utilize to create the language models (e.g., insert keywords for X, Y, and Z related to your skill and a custom model will be created from the template).

Scoring engine element 330 generates a score for each of the computing service skills in relation to natural language input 304, while taking into account scoring signals 332. The scoring signals may include: contextual information from a computing device associated with natural language input 304, information associated with an application or document related to natural language input 304, information associated with a shell construct related to natural language input 304, and a user profile associated with natural language input 304, for example. In examples where a computing service skill that is being scored is an object retrieval skill, scoring engine element 330 may generate a score for each of a plurality of objects in relation to natural language input 304. That is, the scores may be generated based not only on the relevance of the skill to natural language input 304, but also the relevance of an object to natural language input 304 and/or contextual information associated with natural language input 304.

Moving to the lower portion of computing environment and process flow 300 there is skill 1 score element 334 which represents a score that has been generated for computing service skill 1 based on application of NLP model A 320 to natural language input 304; skill 2 score element 336 which represents a score that has been generated for computing service skill 2 based on application of NLP model B 324 to natural language input 304; and skill N score element 338 which represents a score that has been generated for computing service skill N based on application of NLP model N 328 to natural language input 304.

Figure 4:
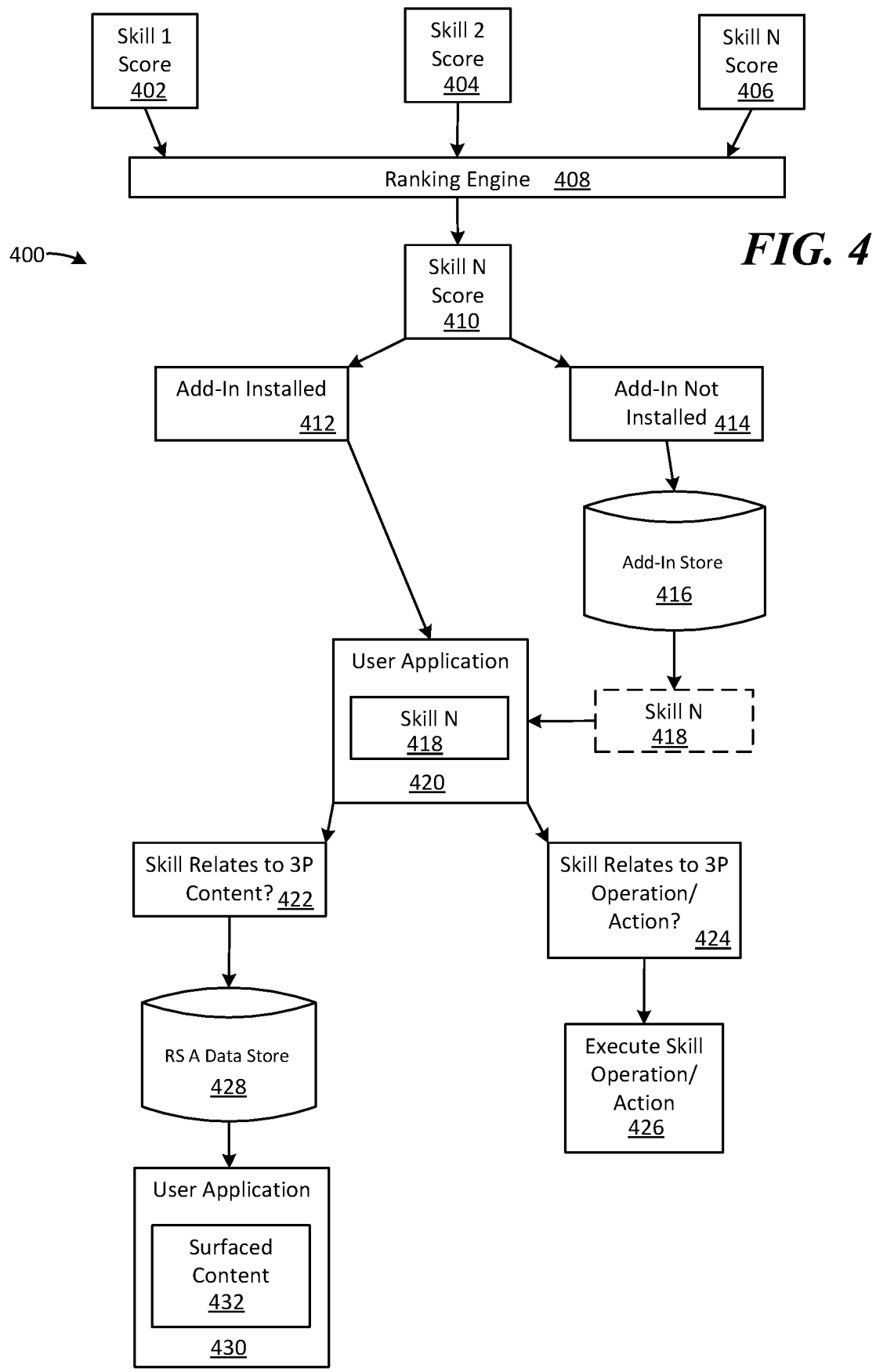
FIG. 4 is a block diagram illustrating a computing environment and process flow for identifying and executing a highest-ranked computing service skill based on a natural language input.

FIG. 4 is a block diagram illustrating a computing environment and process flow 400 for identifying and executing a highest-ranked computing service skill based on a natural language input.

At the top of computing environment and process flow 400 there are three score elements (which may be the same score elements as described above in relation to FIG. 3) that have been generated based on application of individual skill-specific language models to natural language input 304. Those score elements are skill 1 score element 402, skill 2 score element 404, and skill N score element 406. Each of those scores is ranked by a ranking engine as illustrated by ranking engine element 408. In some examples, the scores may be weighted based on one or more factors.

The top-ranked computing service skill is skill N, as illustrated by skill N score element 410. When a highest-ranked skill is identified, a determination may be made as to whether an add-in for executing that skill is already installed on the computing device that the natural language input was received from (the client device or local device). Thus, if a determination is made that the add-in is not installed, as illustrated by add-in not installed element 414, the add-in for the highest-ranked skill may be automatically obtained from add-in store 416 and installed by the computing device. This is illustrated by skill N element 418 in user application element 420. Alternatively, if a determination is made that the add-in is already installed, as illustrated by add-in installed element 412, the add-in corresponding to the highest-ranked skill need not be obtained again from add-in store 416.

The lower left side of computing environment and process flow 400 illustrates the operations that are performed in the instances where the highest-ranked computing service skill relates to remote service content (e.g., files, images, graphs, contact information, etc.). Thus, if a determination is made that the highest-ranked skill does relate to remote service content, as illustrated by process element 422, remote service data store 428, which corresponds to the storage location where the remote service maintains content associated with the user account accessing the computing device, may be accessed via the highest-ranked computing service skill and corresponding add-in, and the content relevant to the natural language input may be obtained and surfaced by the application containing the natural language input. The surfacing of that content is illustrated by surfaced content element 432 in user application element 430.

The lower right side of computing environment and process flow 400 illustrates operations that are performed in the instances where the highest-ranked computing service skill does not relate to remote service content. That is, the highest-ranked computing service skill relates to operations and/or actions that are performed via an application or service add-in. Examples of computing service skills that do not relate to remote service content, which may be exposed, accessed and/or executed via the mechanisms described herein include: interacting with IoT devices (e.g., home security systems, lighting systems, etc.), interacting with online retail services (e.g., placing orders, tracking shipments), and other service-based application and service operations. Thus, if a determination is made that the highest-ranked skill does not relate to remote service content, as illustrated by process element 424, the client computing device may execute the highest-ranked computing service skill via the application and/or service add-in, and the skill may be executed. This is illustrated by process element 426.

Figure 5:
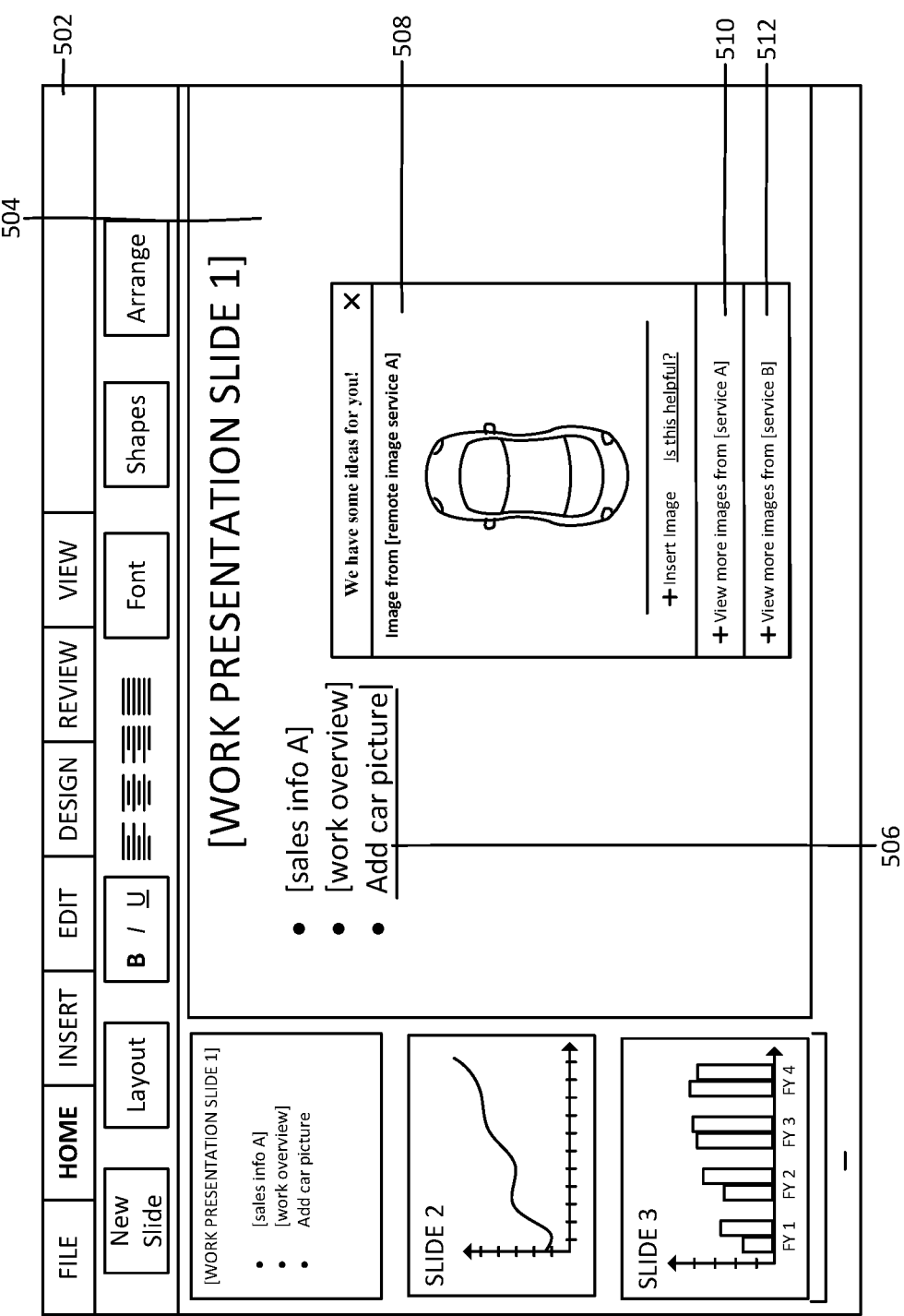
FIG. 5 illustrates a user interface of a presentation application that has surfaced a suggestion for adding remote service content to a currently active presentation instance based on a natural language input.

FIG. 5 illustrates a user interface 502 of a presentation application that has surfaced a suggestion for adding remote service content to a currently active presentation instance based on a natural language input. Document 504 is the currently active presentation instance. Document 504 is a slide deck that is a work presentation. The heading of document 504 is "[WORK PRESENTATION SLIDE 1]", and there is text on document 504 next to three bullets. The text next to the first bullet states "[sales info A]". The text next to the second bullet states "[work overview]". The text next to the third bullet is natural language input 506, which is processed by the intent service according to the aspects described herein, and states: "Add car picture".

In this example, the intent service has applied a plurality of language models (each language model corresponding to a computing service skill) to natural language input 506, and a computing service skill from [remote image service A] has been identified as a highest-ranked, and most relevant, computing service skill in relation to natural language input 506. This is illustrated by surfaced suggestion window 508, which states: "We have some ideas for you!" There is an image of a car displayed in suggestion window 508 that has been obtained from [remote image service A] via the highest-ranked computing service skill and corresponding add-in for accessing content from that service. The specific image that has been obtained and surfaced in suggestion window 508 may have been identified as being relevant to natural language input 506. That is, the image service data store may contain car images and other image types, but the surfaced car image may have been identified as being relevant to natural language input 506 based on one or more language models and/or machine learning models. Below the car image there is a selectable option to insert the image into document 504, and a link to provide feedback to the input service regarding whether the suggestion was helpful.

Also surfaced in suggestion window 508 are two additional suggestions (suggestion 510 and suggestion 512). The computing service skills associated with [service A] (suggestion 510) and [service B] (suggestion 512) were ranked lower by the intent service than the first suggestion for [remote image service A]. However, those suggestions are also provided in suggestion window 508, with the selectable option to "view more images" from each of those services. More or fewer service suggestions may be surfaced according to the aspects described herein.

Figure 6:
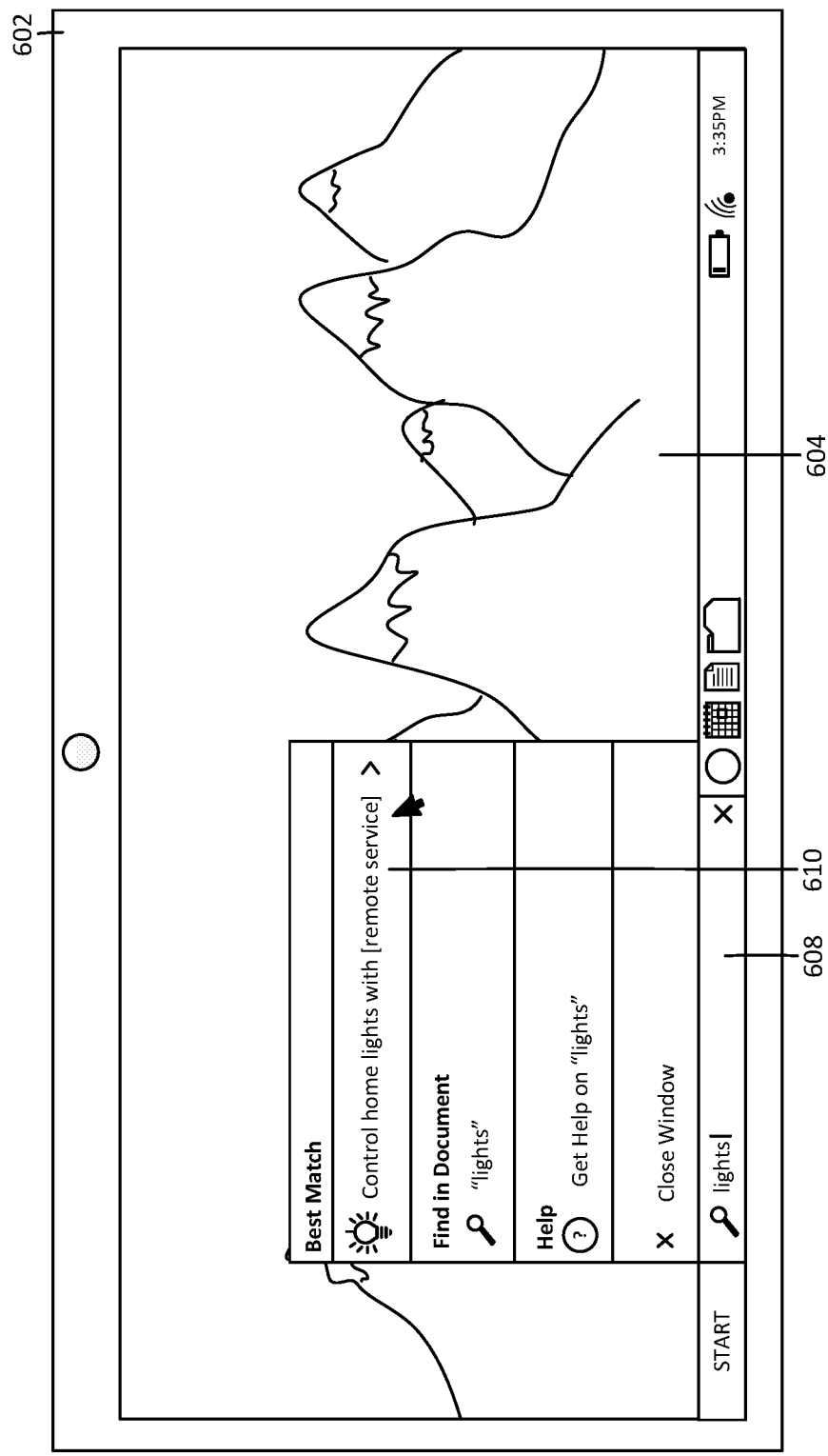
FIG. 6 illustrates a computing device displaying results of a natural language input query in a shell construct of an operating system executed by the computing device.

FIG. 6 illustrates a computing device 602 displaying results of a natural language input query in a shell construct of an operating system executed by computing device 602. In this example, the natural language input "lights" has been typed into search element 608 of the toolbar on desktop 604 of computing device 602. The intent service has applied a plurality of language models (each language model corresponding to a computing service skill) to the natural language input "lights", and computing service skill 610 from [remote service] has been identified as a highest-ranked, and most relevant, computing service skill in relation to that natural language input "lights". This is illustrated by surfaced suggestion element 610 in the pop-out search window. Suggestion element 610 states: "Control home lights with [remote service]".

According to examples, the intent service may have identified that a user account (or a related user account) associated with computing device 602 is also associated with the remote service that provides mechanisms for controlling home lights from a computer over a network. As such, a user may select suggestion element 610 and control various features of lights associated with the user's home via one or more add-ins that are related to the highest-ranked computing service skill. For example, one or more add-ins may be utilized to turn on and off lights and/or dim or brighten lights via the remote lights service.

Figure 7:
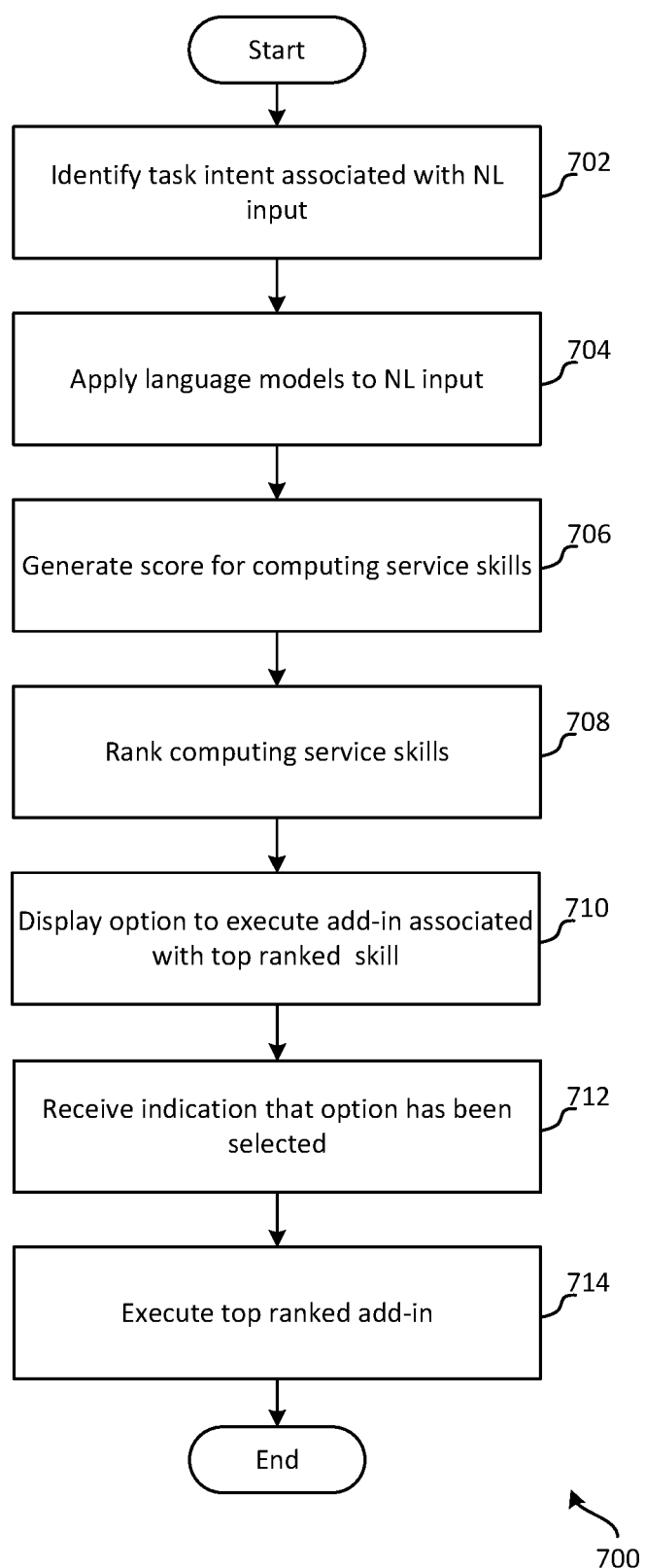
FIG. 7 is an exemplary method for exposing computing service skills.

FIG. 7 is an exemplary method 700 for exposing computing service skills. The method 700 begins at a start operation and flow moves to operation 702.

At operation 702 a task intent associated with a natural language input is identified. In examples, identifying the task intent may comprise determining to a threshold likelihood that the natural language input includes a task intent. The natural language input may be a user input (e.g., typing, voice transcription) in an application (e.g., a word processing application, a presentation application, etc.), a document, and/or an operating system shell construct (e.g., a taskbar search element, a file browsing search element). The natural language input may be a single word or a phrase. In examples, the natural language input may be a direct command (e.g., "insert object A", "perform operation B"). In other examples, the natural language input may be an implicit command (e.g., "you can find the deck here").

From operation 702 flow continues to operation 704 where a plurality of add-in matching language models is applied to the natural language input. In examples, each of the add-in matching language models may correspond to a different computing service skill. The language models may be stored in a manifest. The manifest may additionally or alternatively comprise: metadata describing each of the computing service skills; one or more surfaces that each of the computing service skills may be surfaced on; a description of how each of the computing service skills may be rendered; and/or logic for coordinating at least one of: data-fetching associated with each of the computing service skills, and triggering of each of the computing service skills.

One or more of the language models may be simple models such as keyword and/or phrase matching models. One or more of the language models may be more sophisticated models. For example, the models may be one or more of: a sematic parsing model, a topic detection model, a hidden Markov model, a maximum entropy Markov model, a conditional random field model, a support vector machine model, a decision tree model, a deep neural network model, a general sequence-to-sequence model, a conditional probability recurrent neural network model, a transformer network model, a generative model, a recurrent neural network for feature extractors model, a long short-term memory model, a GRU model, a deep neural network model for word-by-word classification, and/or a latent variable graphical model, for example.

From operation 704 flow continues to operation 706 where a score for each of the computing service skills is generated. The scores may be generated based on a determined relevance of each of the computing service skills to the natural language input. In instances where a skill relates to the obtaining of an object associated with a remote service, a score relating to the relevance of one or more of the objects in the remote service to the natural language input may also be generated. The object score for a skill may be a separate score from the skill score or the object score may be taken into account in generating the skill score. One or more additional factors and/or signals may be taken into account in generating a score for a computing service skill and/or object. Other factors and/or signals that may be taken into account may include: contextual information from a computing device associated with the natural language input, an identity of an application or document associated with the natural language input, content included in an application or document associated with the natural language input, a type of shell construct associated with a natural language input, and/or a user profile associated with the natural language input, for example.

From operation 706 flow continues to operation 708 where each of the computing service skills is ranked. The computing service skills are ranked according to their corresponding scores that were generated at operation 704.

From operation 708 flow continues to operation 710 where a selectable option to execute an add-in associated with a top ranked computing service skill is caused to be displayed. In examples, the selectable option may be surfaced in an application, document, or shell construct where the natural language input is located. The selectable option may comprise an option to insert an object into a document (e.g., insert sales graph, insert contact card for business contact), insert a link to an object in a document, perform an operation associated with a remote service (e.g., create purchase order, send email, turn on porch lights, order milk for smart fridge), etc. In examples where the add-in is not already installed on the client computing device the add-in may be automatically obtained from a remote add-in store and subsequently installed on the client computing device.

From operation 710 flow continues to operation 712 where an indication that a selection of the option has been made is received. That is, a user may have selected the option via a click of a mouse, a touch input, a voice input, etc., and an indication of that selection may be received.

From operation 712 flow continues to operation 714 where the add-in associated with the top ranked computing service skill is executed.

From operation 714 flow moves to an end operation and the method 700 ends.

Figure 8:
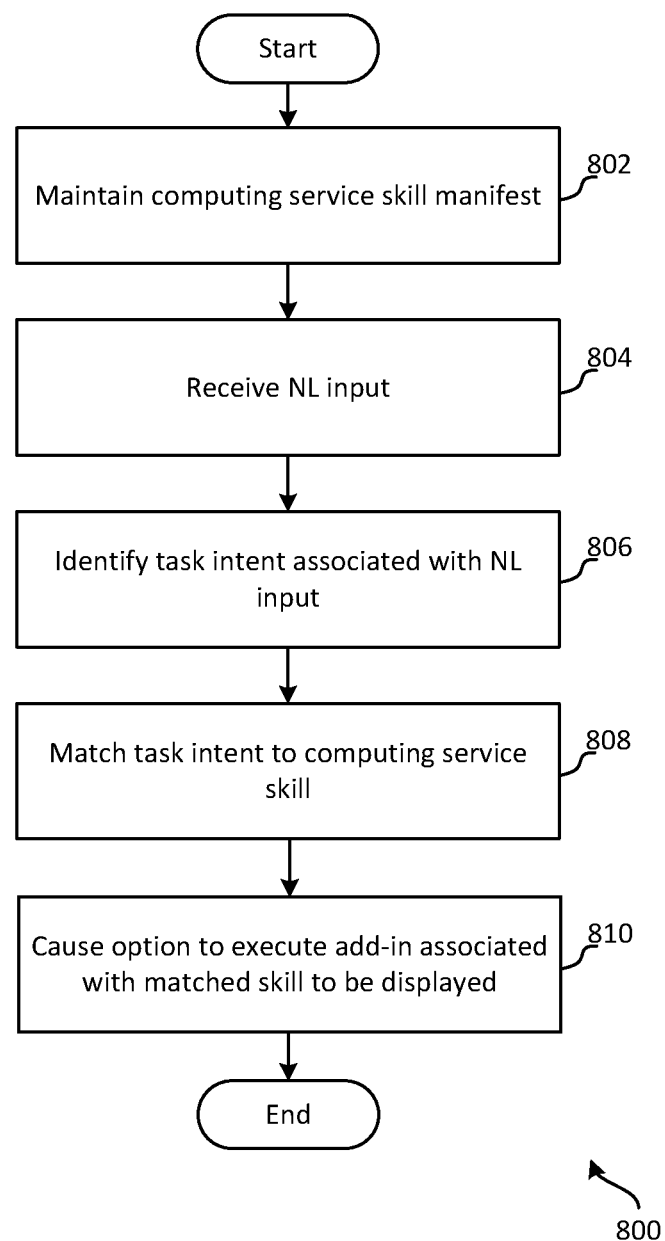
FIG. 8 is another exemplary method for exposing computing service skills.

FIG. 8 is another exemplary method 800 for exposing computing service skills. The method 800 begins at a start operation and flow moves to operation 802.

At operation 802 a manifest comprising an identity of each of a plurality of computing service skills is maintained. Each of the plurality of computing service skills may be associated with an add-in. In examples, the manifest may also comprise metadata describing each of the plurality of computing service skills; one or more surfaces that each of the computing service skills may be surfaced on; logic for coordinating data-fetching associated with at least one of the computing service skills; and/or logic for coordinating triggering of each of the computing service skills.

From operation 802 flow continues to operation 804 where a natural language input is received from a user interface surface of a computing device. In some examples, the user interface surface may comprise the body of a document in a productivity application. In other examples, the user interface surface may comprise a search input element of a shell construct of an operating system.

From operation 804 flow continues to operation 806 where a task intent associated with the natural language input is identified. In examples, identifying the task intent may comprise determining to a threshold likelihood that the natural language input includes a task intent. Identifying a task intent may comprise applying one or more natural language processing models to the natural language input. The natural language processing models may have been trained to identify one or more task intent types (e.g., perform operation, insert object, identify object, etc.).

From operation 806 flow continues to operation 808 where the task intent is matched to one of the plurality of computing service skills. In some examples, one or more of the computing service skills may be purely operational service skills (e.g., turn lights on, order item X). In additional examples, one or more of the computing service skills may be operational and content-oriented skills (e.g., identify relevant object and insert relevant object in document).

From operation 808 flow continues to operation 810 where a selectable option to execute an add-in associated with the matched computing service skill is caused to be displayed on the user interface surface of the computing device. According to examples, if the add-in is not already installed on the client computing device, the add-in may be automatically obtained and/or installed upon receiving a selection of the option.

From operation 810 flow moves to an end operation and the method 800 ends.

Figure 9:
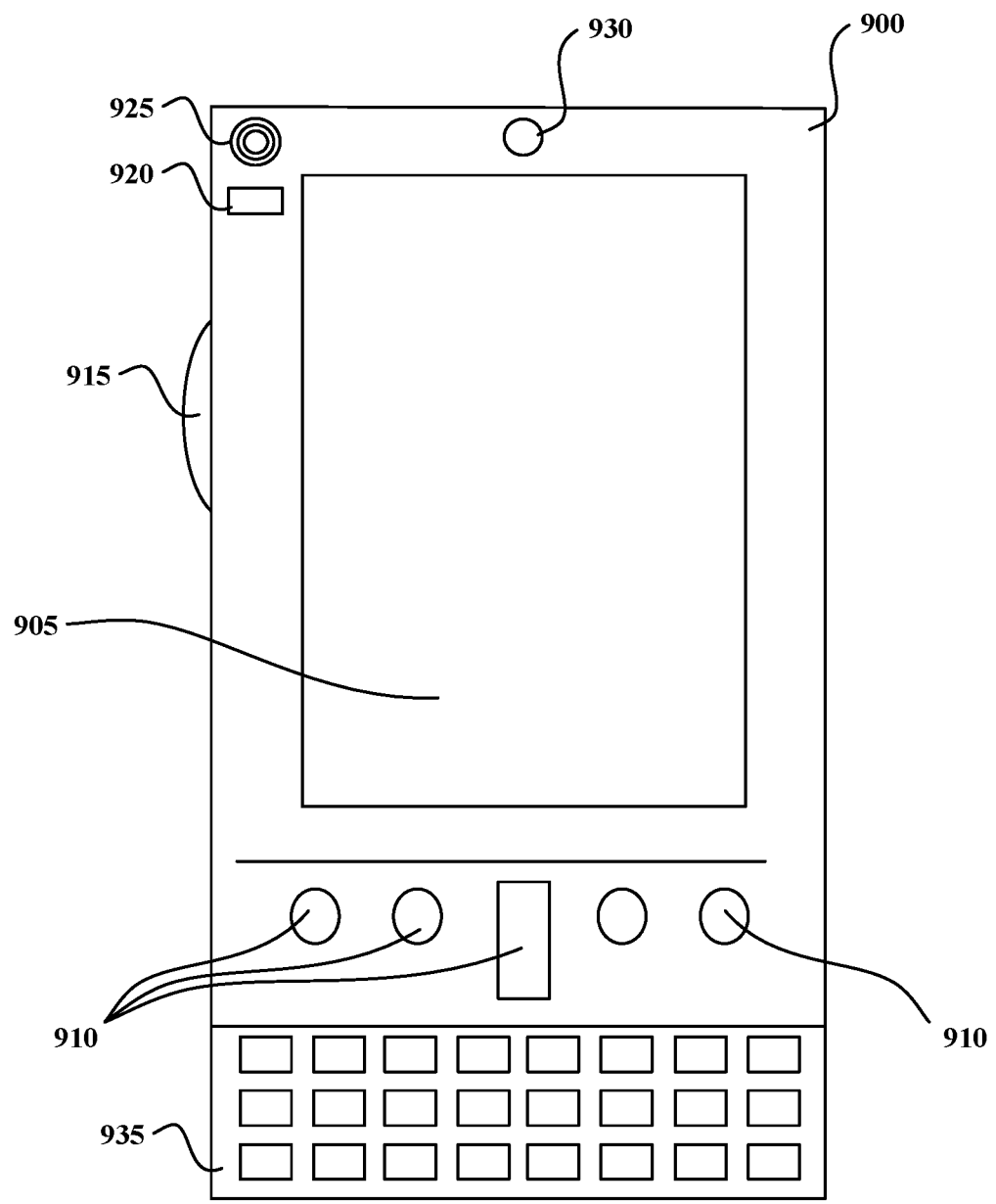
FIGS. 9 and 10 are simplified diagrams of a mobile computing device with which aspects of the disclosure may be practiced.
Figure 10:
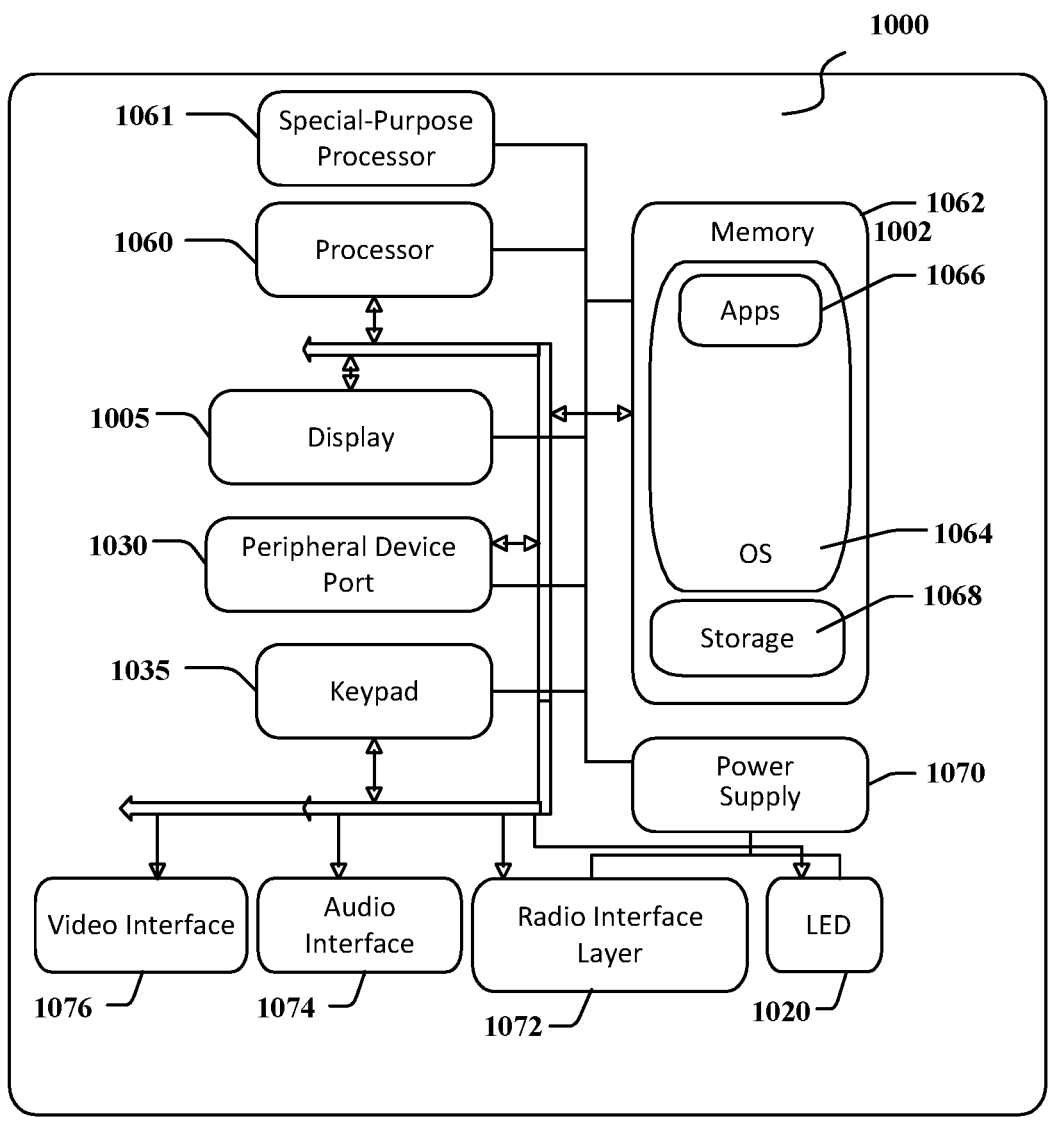

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a task intent platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
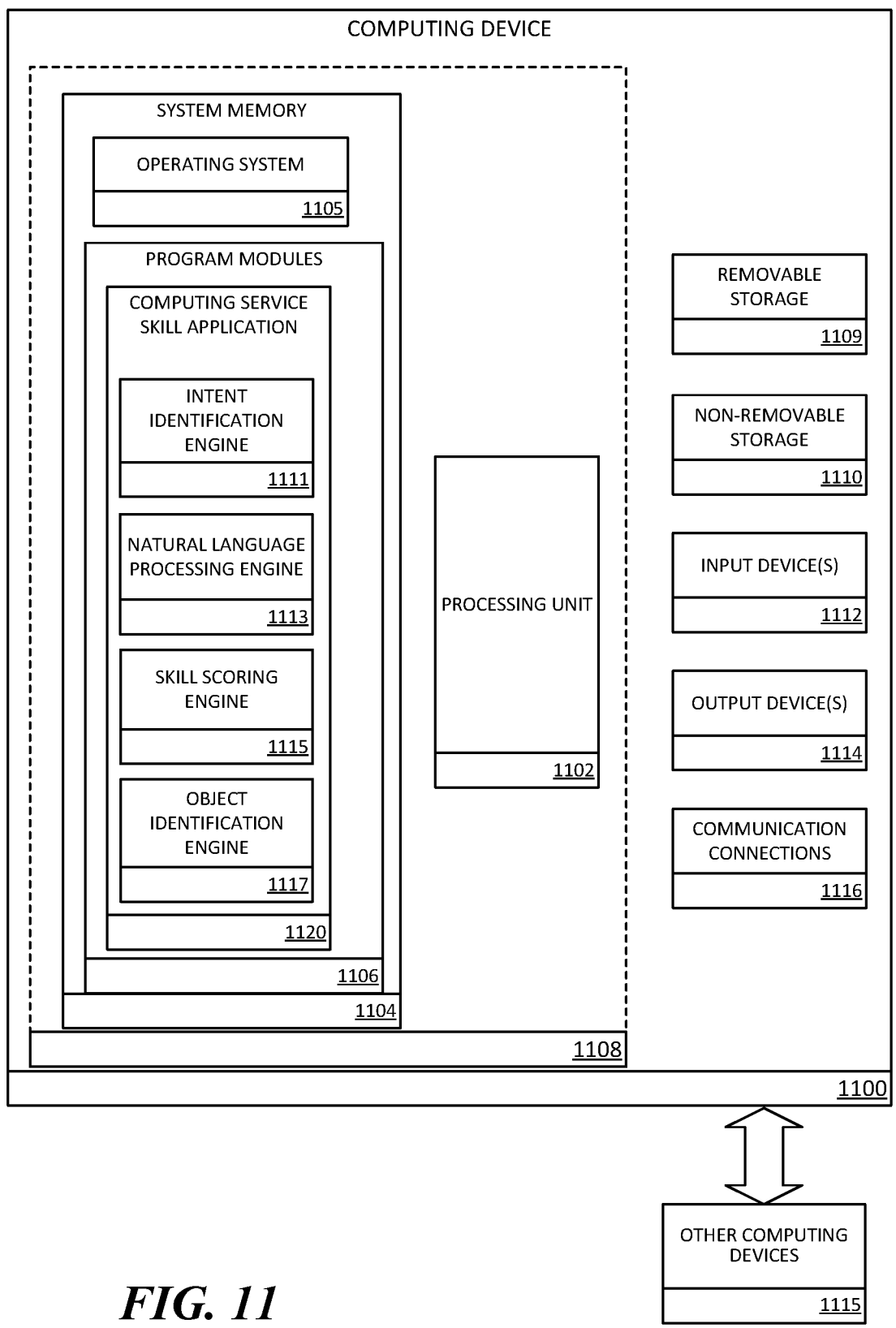
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for exposing skills and add-ins in relation to natural language inputs. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more intent applications and/or services. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., computing service skill application 1120) may perform processes including, but not limited to, the aspects, as described herein. According to examples, intent identification engine 1111 may perform one or more operations associated with determining whether a natural language input includes a task intent and/or identifying a task intent type associated with a natural language input. Natural language processing engine 1113 may perform one or more operations associated with matching a natural language input and/or identified task intent to one or more computing service skills. Skill scoring engine 1115 may perform one or more operations associated with generating a score for each computing service skill based on its relevance to a natural language input. Object identification engine 1117 may perform one or more operations associated with identifying relevant objects to a natural language input and/or task intent from a remote service.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
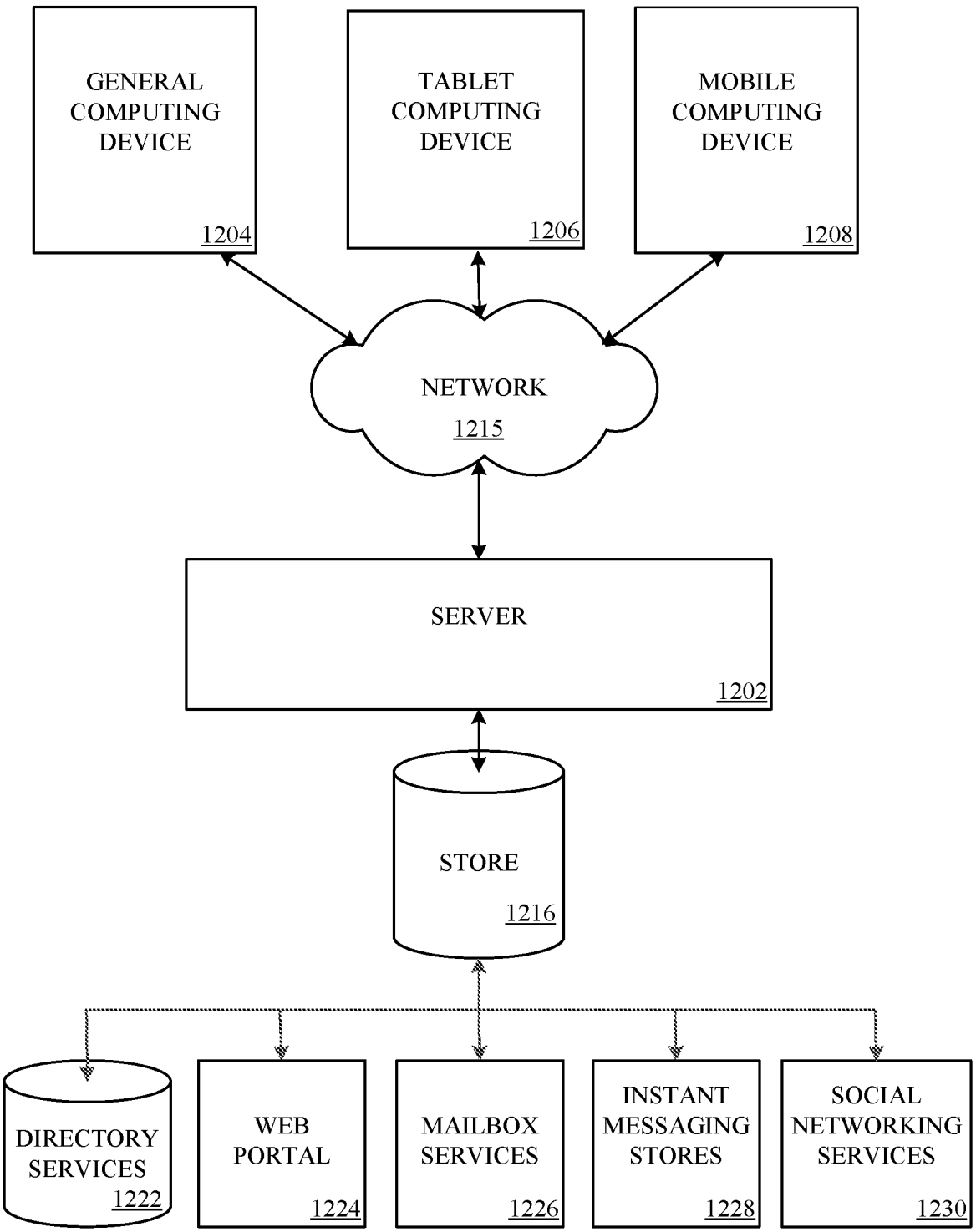
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for exposing computing service skills, the computer-implemented method comprising:
    identifying a task intent associated with a natural language input;
    applying a plurality of add-in matching language models to the identified task intent, wherein each add-in matching language model corresponds to a computing service skill;
    calculating, based on application of the plurality of add-in matching language models to the identified task intent, a match score between the identified task intent and each of the computer service skills;
    calculating a second match score between each of the plurality of add-in matching language models and the natural language input;
    generating, based at least in part on the calculated match scores, a rank score for each of the computing service skills;
    ranking each of the computing service skills;
    causing a selectable option to execute an add-in associated with a top ranked computing service skill to be displayed;
    receiving an indication that a selection of the option has been made; and
    executing the add-in associated with the top ranked computing service skill.

2. The computer-implemented method of claim 1, further comprising:
    maintaining a manifest comprising each of the add-in matching language models.

3. The computer-implemented method of claim 2, wherein the manifest further comprises:
    metadata describing each of the computing service skills;
    one or more surfaces that each of the computing service skills may be surfaced on;
    a description of how each of the computing service skills may be rendered; and
    logic for coordinating at least one of: data-fetching associated with each of the computing service skills, and triggering of each of the computing service skills.

4. The computer-implemented method of claim 1, further comprising:

determining that a computing device on which the selection of the option was made does not have the add-in associated with the top ranked computing service skill installed; and installing the add-in associated with the top ranked computing service skill on the computing device.

5. The computer-implemented method of claim 1, wherein:

the natural language input is received from a productivity application executed on a computing device; and each of the computing service skills has been approved for use on the computing device based on a tenancy rule.

6. The computer-implemented method of claim 1, further comprising:

modifying the second match score based on at least one signal associated with each of the computing service skills, wherein the at least one signal for each of the computing service skills comprises an identity of an object in a resource.

7. The computer-implemented method of claim 1, wherein identifying the task intent associated with the natural language input comprises:

applying a natural language processing model to the natural language input.

8. A system for exposing computing service skills, comprising:

a memory for storing executable program code; and one or more processors, functionally coupled to the memory, the one or more processors being responsive to computer-executable instructions contained in the program code and operative to:

maintain a manifest comprising:

an identity of each of a plurality of computing service skills, wherein each of the plurality of computing service skills is associated with an add-in, metadata describing each of the plurality of computing service skills, and one or more surfaces that each of the computing service skills may be surfaced on;

receive a natural language input from a user interface surface of a computing device;

identify a task intent associated with the natural language input;

calculate a match score between the identified task intent and each of the plurality of computing service skills;

match the task intent to a highest ranked one of the plurality of computing service skills; and cause a selectable option to execute an add-in associated with the matched computing service skill to be displayed on the user interface surface of the computing device.

9. The system of claim 8, wherein the user interface surface is a body of a document in a productivity application.

10. The system of claim 8, wherein the user interface surface is a search input element of a shell construct of the computing device.

11. The system of claim 8, wherein the manifest further comprises logic for coordinating at least one of:

data-fetching associated with at least one of the computing service skills; and triggering of each of the computing service skills.

12. The system of claim 11, wherein the logic for coordinating the data-fetching associated with at least one of the computing service skills corresponds to documents stored in a remote service store.

13. A computer storage media comprising executable instructions that, when executed by one or more processors, assist with exposing computing service skills, the computer storage media including instructions executable by the one or more processors for: identifying a task intent associated with a natural language input; applying a plurality of add-in matching language models to the natural language input, wherein each add-in matching language model corresponds to a computing service skill; calculating a match score between each of the plurality of add-in matching language models and the natural language input; calculating a second match score between the identified task intent and each of the computing service skills; generating, based at least in part on the calculated match scores, a rank score for each of the computing service skills; ranking each of the computing service skills; causing a selectable option to execute an add-in associated with a top ranked computing service skill to be displayed; receiving an indication that a selection of the option has been made; and executing the add-in associated with the top ranked computing service skill.

14. The computer storage media of claim 13, wherein the instructions are further executable by the one or more processors for: maintaining a manifest comprising each of the add-in matching language models.

15. The computer storage media of claim 14, wherein the manifest further comprises: metadata describing each of the computing service skills; one or more user interface surfaces that each of the computing service skills may be surfaced on; and logic for coordinating data-fetching associated with at least one of the computing service skills.

16. The computer storage media of claim 14, wherein the manifest further comprises a description of how each of the computing service skills may be rendered.

17. The computer storage media of claim 13, wherein the instructions are further executable by the one or more processors for: determining that a computing device on which the selection of the option was made does not have the add-in associated with the top ranked computing service skill installed; and installing the add-in associated with the top ranked computing service skill on the computing device.

18. The computer storage media of claim 13, wherein the natural language input is received from a productivity application executed on a computing device.

19. The computer storage media of claim 18, wherein each of the computing service skills has been approved for use on the computing device based on a tenancy rule.

20. The computer storage media of claim 13, wherein the instructions are further executable by the one or more processors for: modifying the match score based on at least one signal associated with each of the computing service skills, wherein the at least one signal for each of the computing service skills comprises an identity of an object in a resource.

* * * * *